US00RE41790E

(19) United States
(12) Reissued Patent
Stanley

(10) Patent Number: US RE41,790 E
(45) Date of Reissued Patent: Oct. 5, 2010

(54) SEAT BELT TENSION PREDICTION

(75) Inventor: James G. Stanley, Novi, MI (US)

(73) Assignee: TK Holdings Inc., Auburn Hills, MI (US)

(21) Appl. No.: 11/417,251

(22) Filed: May 4, 2006

Related U.S. Patent Documents

Reissue of:
(64) Patent No.: 6,161,439
Issued: Dec. 19, 2000
Appl. No.: 09/075,584
Filed: May 11, 1998

U.S. Applications:
(62) Division of application No. 10/326,170, filed on Dec. 19, 2002, now Pat. No. Re. 40,096.
(60) Provisional application No. 60/046,233, filed on May 12, 1997.

(51) Int. Cl.
*G01L 1/26* (2006.01)

(52) U.S. Cl. ..... 73/862.391; 280/735
(58) Field of Classification Search ..... 73/862.391; 280/735; 307/10.1; 180/273
See application file for complete search history.

(56) References Cited

U.S. PATENT DOCUMENTS

| | | | | |
|---|---|---|---|---|
| 3,889,529 | A | 6/1975 | Bradley | 73/141 R |
| 3,992,946 | A | 11/1976 | Bradley | 73/407 R |
| 4,056,156 | A | 11/1977 | Dayton | 177/209 |
| 4,219,090 | A | 8/1980 | Dayton | 177/208 |
| 4,360,071 | A | 11/1982 | Dyck | 177/208 |
| 4,383,584 | A | 5/1983 | Dyck | 177/208 |
| 4,827,091 | A | 5/1989 | Behr | 200/61.45 M |
| 4,914,263 | A | 4/1990 | Behr | 200/61.45 M |

(Continued)

OTHER PUBLICATIONS

UniForce Technical Notes and Sensor Design Guide, Force Imaging, 3424 Touhy Avenue, Chicago, IL 60645–2717, pp. 1 through 8.

IMRC Prescon Sensors with Low Threshold Actuation, International Microelectronics Research Corporation, 11132 E. Edition St., Tucson, AZ 85749–9773, pp. 1 thru 3 also 3 usage and applications pages.

FSR Integration Guide & Evaluation Parts Catalog with Suggested Electrical Interfaces, Interlink Electronics, 546 Flynn Road, Camarillo, CA 93012, pp. 1 through 27.

UniForce Technical Notes #101 (Rev. Jul. 1995), Force Imaging Technologies, 3424 Touhy Avenue, Chicago, IL 60645–2717, pp. 1 through 4.

Tactile Sensing, 1990's Style by Wesley R. Iverson, Assembly Magazine, Feb.–Mar. 1993 Issue, pp. 23 through 26.

* cited by examiner

*Primary Examiner*—Jewel Thompson
(74) *Attorney, Agent, or Firm*—Foley & Lardner LLP

(57) ABSTRACT

A vehicle seat belt tension prediction system and method comprises an accelerometer having an output signal responsive to vertical acceleration of the vehicle, a seat weight sensor having an output signal responsive to the force exerted by a mass resting on the seat, and a processor means for calculating seat belt tension. The processor is provided with a plurality of inputs operatively coupled to the accelerometer output and seat weight sensor output. Suitable programming is provided to instruct the processor to calculate the average mass resting on the vehicle seat and predict the force that should be exerted on the seat for a measured level of vertical acceleration assuming zero belt tension. The processor then compares the actual force measured by the seat weight sensor with the predicted force to determine seat belt tension thereby obviating the necessity of complex hardware in physical contact with the seat belt system.

18 Claims, 3 Drawing Sheets

U.S. PATENT DOCUMENTS

| | | | | |
|---|---|---|---|---|
| 4,922,065 | A | | 5/1990 | Behr et al. ..... 200/61.45 M |
| 4,933,515 | A | | 6/1990 | Behr et al. ..... 200/61.45 M |
| 4,957,286 | A | | 9/1990 | Persons et al. ..... 272/73 |
| 4,987,898 | A | | 1/1991 | Sones ..... 128/645 |
| 5,117,373 | A | | 5/1992 | Huff ..... 364/550 |
| 5,149,925 | A | | 9/1992 | Behr et al. ..... 200/61.45 M |
| 5,161,820 | A | | 11/1992 | Vollmer ..... 280/730 |
| 5,163,325 | A | | 11/1992 | White et al. ..... 73/517 R |
| 5,232,243 | A | | 8/1993 | Blackburn et al. ..... 280/732 |
| 5,369,231 | A | | 11/1994 | Anderson et al. .... 200/61.45 M |
| 5,454,591 | A | | 10/1995 | Mazur et al. ..... 280/735 |
| 5,474,327 | A | | 12/1995 | Schousek ..... 280/735 |
| 5,484,166 | A | | 1/1996 | Mazur et al. ..... 280/735 |
| 5,496,979 | A | | 3/1996 | Behr ..... 200/61.45 M |
| 5,573,269 | A | | 11/1996 | Gentry et al. ..... 280/735 |
| 5,606,516 | A | | 2/1997 | Douglas et al. ..... 364/571.04 |
| 5,614,700 | A | | 3/1997 | Moss et al. ..... 200/61.45 M |
| 5,900,677 | A | * | 5/1999 | Musiol et al. ..... 307/10.1 |
| 5,984,349 | A | * | 11/1999 | Van Voorhies ..... 280/735 |
| 6,056,079 | A | | 5/2000 | Cech ..... 180/273 |
| 6,084,314 | A | | 7/2000 | McCurdy ..... 307/10.1 |
| 6,550,810 | B1 | * | 4/2003 | Bauer et al. ..... 280/803 |

* cited by examiner

SEAT BELT TENSION PREDICTION

Matter enclosed in heavy brackets [ ] appears in the original patent but forms no part of this reissue specification; matter printed in italics indicates the additions made by reissue.

CROSS REFERENCE TO RELATED APPLICATIONS

*More than one reissue application has been filed for reissue of U.S. Pat. No. 6,161,439. In particular, two applications for reissue of U.S. Pat. No. 6,161,439 have been filed: Reissue application Ser. No. 10/326,170, filed Dec. 19, 2002, and the present reissue application, which is a divisional reissue application thereof.*

The instant application claims the benefit of U.S. Provisional Application Ser. No. 60/046,233, filed May 12, 1997.

Co-pending U.S. application Ser. No. 08/993,701 entitled "Seat Weight Sensor Having Fluid Filled Bladder", filed on Dec. 18, 1997, claiming benefit of U.S. Provisional Application Ser. No. 60/032,380 filed on Dec. 19, 1996, and assigned to the assignee of the instant invention discloses a hydrostatic weight sensor comprising a fluid filled bladder and a pressure sensor for sensing the weight of an occupant in a vehicle seat for controlling a safety restraint system. U.S. application Ser. No. 08/993,701 also discloses a load distributor for distributing loads across the load bearing surface of the hydrostatic weight sensor. U.S. application Ser. No. 08/993,701 and U.S. Provisional Application Ser. No. 60/032,380 are incorporated herein by reference.

Co-pending U.S. application Ser. No. 09/003,672 entitled "Automotive Seat Weight Sensing System", filed on Jan. 7, 1997, claiming benefit of U.S. Provisional application Ser. No. 60/034,018 filed on Jan. 8, 1997, and assigned to the assignee of the instant invention discloses a seat weight sensing system comprising a plurality of hydrostatic weight sensors each of which is in accordance with U.S. application Ser. No. 08/993,701. U.S. application Ser. No. 09/003,672 and U.S. provisional application Ser. No. 60/034,018 are incorporated herein by reference.

Co-pending U.S. application Ser. No. 09/003,870 entitled "Vehicle Seat Sensor Having Self-Maintaining Air Bladder", filed on Jan. 7, 1997, claiming benefit of U.S. provisional application Ser. No. 60/035,343 filed on Jan. 16, 1997, and assigned to the assignee of the instant invention discloses an apparatus for automatically maintaining the supply of sensing fluid in a hydrostatic weight sensor. U.S. application Ser. No. 09/003,870 and U.S. Provisional Application Ser. No. 60/035,343 are incorporated herein by reference.

Co-pending U.S. application Ser. No. 09/003,868 entitled "Seat Weight Sensor with Means for Distributing Loads", filed on Jan. 7, 1997, claiming benefit of U.S. Provisional Application Ser. No. 60/058,084 filed on Sep. 4, 1997, and assigned to the assignee of the instant invention discloses a load distributor for distributing sensed load across the load bearing surface of a hydrostatic weight sensor. U.S. application Ser. No. 09/003,868 and U.S. Provisional Application Ser. No. 60/058,084 are incorporated herein by reference.

Co-pending U.S. application Ser. No. 09/003,673 entitled "Seat Weight Sensor Having Self-Regulating Fluid Filled Bladder", filed on Jan. 7, 1997, claiming benefit of U.S. Provisional Application Ser. No. 60/058,119 filed on Sep. 4, 1997, and assigned to the assignee of the instant invention discloses a hydrostatic weight sensor having a means for automatically regulating the amount of sensing fluid therein. U.S. application Ser. No. 09/003,673 and U.S. Provisional Application Ser. No. 60/058,119 are incorporated herein by reference.

Co-pending U.S. application Ser. No. 09/003,746 entitled "Seat Weight Sensor Using Fluid Filled Tubing", filed on Jan. 7, 1997, claiming benefit of U.S. Provisional Application Ser. No. 60/065,986 filed on Nov. 14, 1997, and assigned to the assignee of the instant invention discloses a hydrostatic weight sensor incorporating a fluid filled tube. U.S. application Ser. No. 09/003,746 and U.S. Provisional Application Ser. No. 60/065,986 are incorporated herein by reference.

Co-pending U.S. application Ser. No. 09/003,744 entitled "Low Profile Hydraulic Seat Weight Sensor", filed on Jan. 7, 1997, claiming benefit of U.S. Provisional Application Ser. No. 60/065,832 filed on Nov. 14, 1997, and assigned to the assignee of the instant invention discloses a hydrostatic weight sensor constructed from plates or sheets of semi-rigid material and filled with a liquid, grease, Bingham fluid or thixotropic material. U.S. application Ser. No. 09/003,744 and U.S. Provisional Application Ser. No. 60/065,832 are incorporated herein by reference.

TECHNICAL ART

The instant invention relates generally to automotive passenger restraint systems and more specifically to a system and method for predicting seatbelt tension in a vehicle utilizing a seat weight sensor and an accelerometer.

BACKGROUND OF THE INVENTION

Automotive manufacturers and the National Highway Transportation Safety Association are investigating methods to disable vehicle air bags in situations where they may cause more harm than good. Typically, airbags have been developed to deploy with enough force to restrain a 175 lb. adult in a high velocity crash. Deployment of the same air bags when children are seat occupants may cause serious injury due to the force generated upon inflation of the bag.

As a result, seat weight sensors and systems are being developed in an attempt to determine when the passenger seat occupant is a child. Such systems should identify when the occupant is small, or even when a child is in a rear facing infant seat, a forward facing child seat or a booster seat. Occupant weight measurement when a child seat is present is further complicated by the downward force applied to the child seat by the tension of a seat belt. When a child seat is strapped tightly, the seat belt forces the child seat into the vehicle seat and can bag deployment when children or infants are present in the seat.

A variety of methods have been used for seat belt tension measurement. Copending U.S. Provisional Application Ser. No. 60/067,071 entitled "Villari Effect Seat Belt Tension Sensor", and copending U.S. Provisional Application Ser. No. 60/070,319 entitled "Compressive Villari Effect Seatbelt Tension Sensor", both assigned to the assignee of the instant invention, disclose two seat belt tension measurement systems utilizing sensors that operate on the principle known as the Villari effect. The Villari effect refers to the tendency of certain materials with magnetostrictive properties to inhibit or enhance the strength of an electromagnetic field within the material when the material is being subjected to compression or tensile stress. By measuring the field strength in magnetostrictive material placed in line with a seat belt mechanism, for example in a seat belt latch or a seat belt retractor, the relative tension in the belt may be calculated.

Furthermore, belt deflection techniques which guide a seat belt through a mechanical system that forces the belt out of a straight line when there is low tension have been used. Under high tension the seat belt forces the displacement of a mechanical deflector. This force may then be sensed utilizing an electromechanical switch. Tension measurement mechanisms have also been incorporated in the buckle of the seat belt. In one embodiment, a sliding buckle is biased back with a spring. When the belt is under heavy tension, the buckle pulls forward to control a switch that provides feedback to a vehicle processor.

The aforementioned seat belt tension measurement methods suffer from a number of disadvantages. Initially, a great number of additional parts are required for seat belt retractors or buckle configurations. This adds complexity (and therefore cost) to vehicle assembly and provides for considerable difficulty in retrofitting existing vehicles. Additionally, several of the aforementioned tension systems provide only a threshold level of tension detection.

The present invention may be used to detect whether the seat belt is under high tension thereby denoting that an infant seat is present. Furthermore, significant tension in the belt can be predicted without resorting to the complex instrumentation required to measure actual belt tension. Known belt tension measurement systems that directly contact the seat belt require additional hardware and sensors that increase component count and vehicle assembly complexity.

SUMMARY OF THE INVENTION

The instant invention overcomes the aforementioned problems by providing a seat belt tension prediction system employing an accelerometer and a seat weight sensor to accurately determine the tension in a vehicle seat belt and thereby discriminate between the presence of a tightly belted child seat or other object and an adult occupant.

The instant invention measures the "bounce", or vertical acceleration, experienced by a weight on a seat weight measurement means by monitoring an accelerometer that is rigidly mounted to the vehicle seat. The bounce can be thought of as the temporary acceleration of the weight on the seat caused by the vehicle traversing bumps or holes in the road. This road-induced bounce causes oscillations in the force acting upon the seat that may be measured by a seat weight sensor.

A "free" or unbelted mass positioned on a vehicle seat will bounce up and down on the seat and may, for example, completely lose contact with the seat in extreme cases. The weight sensor would correspondingly interpret this extreme case as a "spike" of zero force acting on the seat. Usually, however, the output signal produced by the weight sensor will oscillate with a small amplitude that is dependent upon the total mass acting upon the seat and the amplitude of the road-induced vehicle bounce. When the force acting downwardly on the seat is increased due to the tension in a tight seat belt, the amplitude of oscillation of an output signal produced by the weight sensor will be reduced because a component of the force caused by the tension in the seatbelt is constant. Accordingly, a seatbelt tension may be calculated by determining the vertical acceleration of the vehicle and the variation in force exerted on the seat as measured by the seat weight sensor.

A conventional accelerometer provides an electrical signal proportional to the vertical acceleration that the seat, and therefore the mass in the seat, experiences. When actual vertical acceleration is compared to the oscillating output signal produced by the weight sensor, a measure of the force on the seat attributable to the tension in the seat belt may be calculated. The road-induced vertical acceleration acting on the vehicle is used to predict the amount of force exerted downwardly on the seat given that no seat belt tension is present.

A conventional microprocessor is adapted to accept output signals from the accelerometer and the seat weight sensor. The accelerometer output is responsive to the amount of vertical acceleration caused by road bounce acting on the vehicle seat and the weight sensor output is responsive to the amount of force exerted downwardly on the vehicle seat.

A normalized measurement of seatbelt tension may be calculated by the processor by first calculating an average mass on the seat using the weight sensor output. The expected variation in force is then calculated by multiplying the aforementioned average mass on the seat by the actual acceleration as measured by the accelerometer over a predetermined time period. A normalized seatbelt tension may then be calculated by dividing the variation in force as measured by the seat weight sensor over a predetermined time period by the expected or calculated variation in force over the aforementioned period.

The resultant scalar tension measure will approximate unity for unbelted or loosely belted occupant situations where the mass acting on the seat is free to travel vertically. Accordingly, the normalized tension scalar will decrease when extremely high belt tension is present thereby forcing the mass onto the seat.

Alternatively, the processor may calculate an expected force exerted on the seat due to road-induced vehicle bounce at discrete time intervals, assuming that no belt tension exists, and compare the results with the measured force exerted on the seat at the each discrete point in time. The ratio between the measured force and the calculated or expected force exerted on the seat provides an indication of belt tension.

Known seat weight sensors may comprise one or more pads employing force sensitive resistive (FSR) elements disposed within the seat to provide a weight measurement. These arrangements are typically used as weight threshold systems that are used in conjunction with a processor to disable a passenger air bag when the seat is empty.

Conventional load cells attached to the seat mounting posts have also been used in research applications. The use of load cells as weight measurement means in the instant invention requires that the seatbelts or passenger restraints are not mounted directly to the vehicle seat because a load cell system that weighs the entire seat and its contents including the seatbelts and their mounting points will not be responsive to the force applied to the seat by the tension in the seatbelt.

Mechanisms employing string actuated potentiometers to measure downward seat displacement have also been utilized as weight measurement means. In these mechanisms, a weight resting upon a seat pad causes the pad to sag or curve downwardly, thereby displacing a string that is positioned across the bottom of the seat pad. One end of the string is connected to a potentiometer shaft that is rotated when the string is displaced. The rotation of the potentiometer shaft causes the resistance at the potentiometer output to change. A processor is adapted to measure the changing resistance at the potentiometer output, thereby providing a signal proportional to string displacement, and therefore, the force caused by a mass present on the seat.

Copending U.S. Application Ser. No. 08/993,701 further discloses a weight sensor employing a gas filled bladder disposed within the seat pad to calculate seat weight. When a load is applied to the seat a differential pressure sensor operatively coupled to the bladder generates a signal that is responsive to the pressure on the fluid within the bladder and therefore indicative of the force acting upon the seat. A signal processor having an input operatively coupled to the pressure sensor then calculates the force exerted on the seat as well as the mass present.

By determining the amount of mass present in a vehicle seat and the amount of tension present in a passenger restraint belt, corrective action may be taken to further protect a vehicle occupant by adapting other restraint system components, such as the air bag control system.

The ability to sense the tension present in a seat belt may be used in conjunction with a seat weight sensor to determine the presence of an occupant in a vehicle seat and the relative size of the occupant. This information may be used either to deactivate seatbelt pretensioners, and/or modify the inflation profile of an air bag.

Furthermore, by sensing the amount of tension present in the seat belt, the deployment of an airbag may be inhibited in the presence of infant seats or in situations where occupants are small so as to reduce their risk of injury from the inflating air bag. Therefore, a system that can reliably predict the amount of tension present in a seat belt may be used to great advantage in vehicle safety systems.

One significant advantage of the instant invention is that it does not require numerous ancillary components that are in direct contact with the seat belt system. The present invention can predict whether there is significant tension in the seat belt without directly measuring seat belt tension.

Therefore, one object of the instant invention is to provide a seat belt tension measurement system that does not require a mechanism in direct contact with the seat belt or its associated assembly.

Another object of the instant invention is to use road-induced vertical acceleration exerted on every vehicle as a forcing function for a seat weight sensor signal. The oscillation of an accelerometer signal compared with the oscillation of a weight sensor signal at discrete time intervals provides the data required to calculate seat belt tension.

A yet further object of the present invention is to provide a seat belt tension prediction system that requires minimal additional components beyond a seat weight measurement means and the attendant processor adapted to receive and process various vehicle instrumentation signals. The instant invention requires only an accelerometer or equivalent acceleration sensing device and a conventional microprocessor or equivalent processing means in conjunction with a seat weight sensor to accurately calculate seat belt tension.

A yet further object of the instant invention is to provide a seat belt tension prediction system that is useful in determining the presence of an infant seat in a vehicle. The present invention measures the component of force acting on a vehicle seat that is attributable to tension in the seat belt as well as the component of force attributable to the presence of a mass on the seat, thereby providing a means to predict whether the occupant is an adult or a child.

The instant invention will be more fully understood after reading the following detailed description of the preferred embodiment with reference to the accompanying drawings. While this description will illustrate the application of the instant invention in an automotive safety restraint system, it will be readily understood by one of ordinary skill in the art that the instant invention may also be utilized in other tension measurement systems.

DETAILED DESCRIPTION OF THE PREFERRED EMBODIMENT(S)

Figure 1:
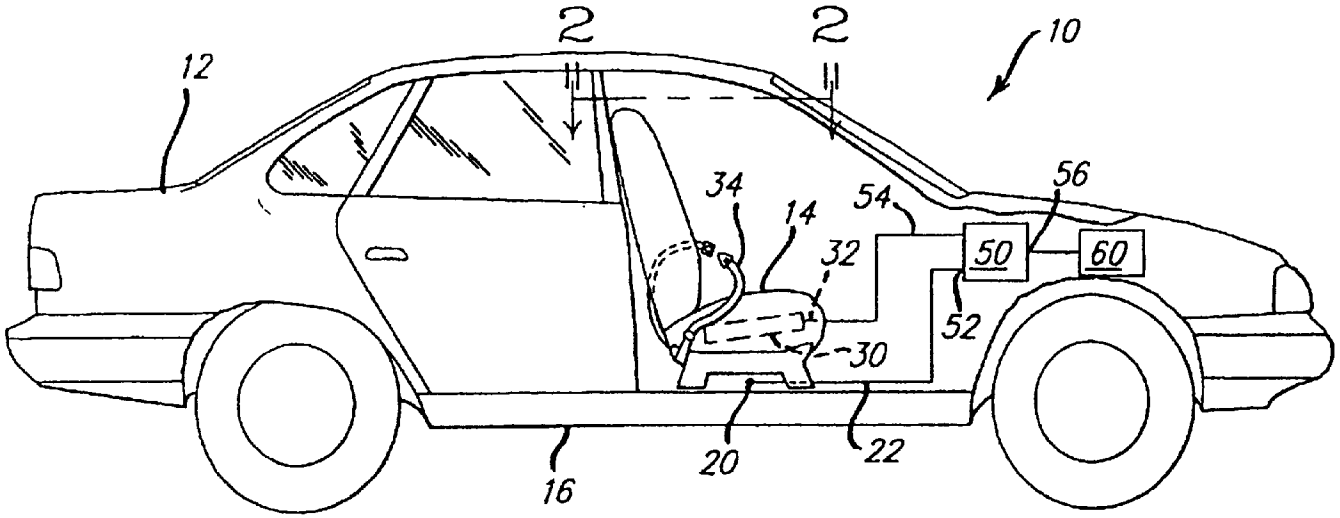
FIG. 1 is a diagrammatical view of a preferred embodiment of the instant invention.

Referring to FIG. 1, a seat belt tension prediction system and method 10 for a vehicle 12 having a seat 14 is comprised of an accelerometer 20 and a seat weight sensor 30. The accelerometer 20 is provided with an output signal 22 that is responsive to the amount of vertical acceleration acting upon the vehicle 12 and, therefore, on the vehicle seat 14. The accelerometer 20 must be rigidly secured to a vehicle structural member 16 that experiences the same vertical acceleration that the vehicle seat 14 is subjected to when traversing variations in terrain. In a preferred embodiment of the instant invention the resolution of the accelerometer 20 is greater than 0.005 g to provide sufficient sensitivity to small variations in vertical acceleration.

The seat weight sensor 30 is provided with an output signal 32 that is responsive to the amount of force exerted downwardly on the vehicle seat 14. Accordingly, the seat weight sensor output signal 32 will also be responsive to additional force upon the vehicle seat 14 exerted by tension in a seat belt 34. The output signal 32 from the weight sensor 30 must have an update period small enough to allow the weight sensor 30 to sense oscillations in force on the seat 14 caused by the vehicle's vertical acceleration. In a preferred embodiment of the instant invention the update period of the weight sensor output signal 32 is less than 25 milliseconds. Additionally, the weight sensor output signal 32 may be AC coupled to filter low frequency signal oscillations that normally occur as a result of occupant movement, thus ignoring those oscillations that are not produced by road-induced vertical acceleration.

Furthermore, a processor 50 is provided, having a first input 52 operatively coupled to the accelerometer output signal 22 and a second input 54 operatively coupled to the seat weight sensor output signal 32. The processor 50 is further operatively coupled to a vehicle airbag control system 60 whereby the processor 50 may provide an output signal 56, or a plurality thereof, to the airbag control system 60 to inhibit deployment of an airbag and/or to modify its inflation profile.

The processor 50 may comprise an analog or digital microprocessor or any equivalent thereof. Although the preferred embodiment of the instant invention utilizes a conventional digital microprocessor, it is readily understood by one having ordinary skill in the art that alternative means such as relay logic circuitry, analog processors, analog to digital converters and TTL logic circuitry may be employed as processor means to practice the instant invention.

Figure 2:
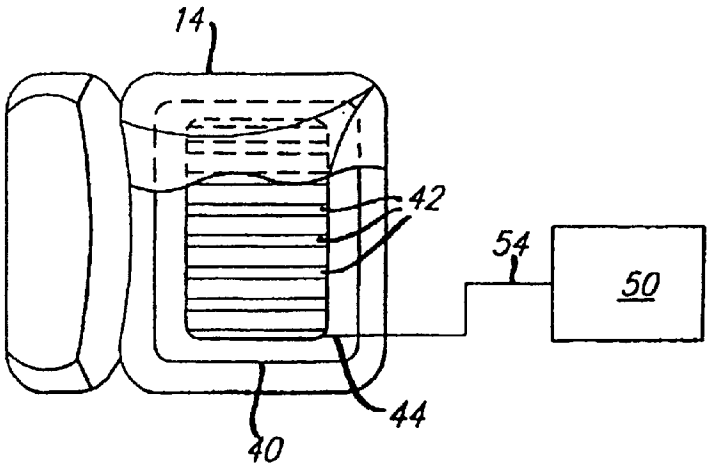
FIG. 2 is a diagrammatical view of an alternative seat weight sensor arrangement taken along the line 2—2 of FIG. 1.

In an alternative embodiment of the instant invention shown in FIG. 2, seat weight sensor 40 comprises a plurality of force sensitive resistive elements 42 disposed within the vehicle seat 14 for measuring force. The force sensitive resistive elements 42 provide as an output signal 44 a variable electrical resistance responsive to the amount of force acting on the elements 42, that may be operatively coupled to the input 54 of processor 50. The variable resistance output signal 44 is generally inversely proportional to the amount of force acting on the seat 14.

Figure 3:
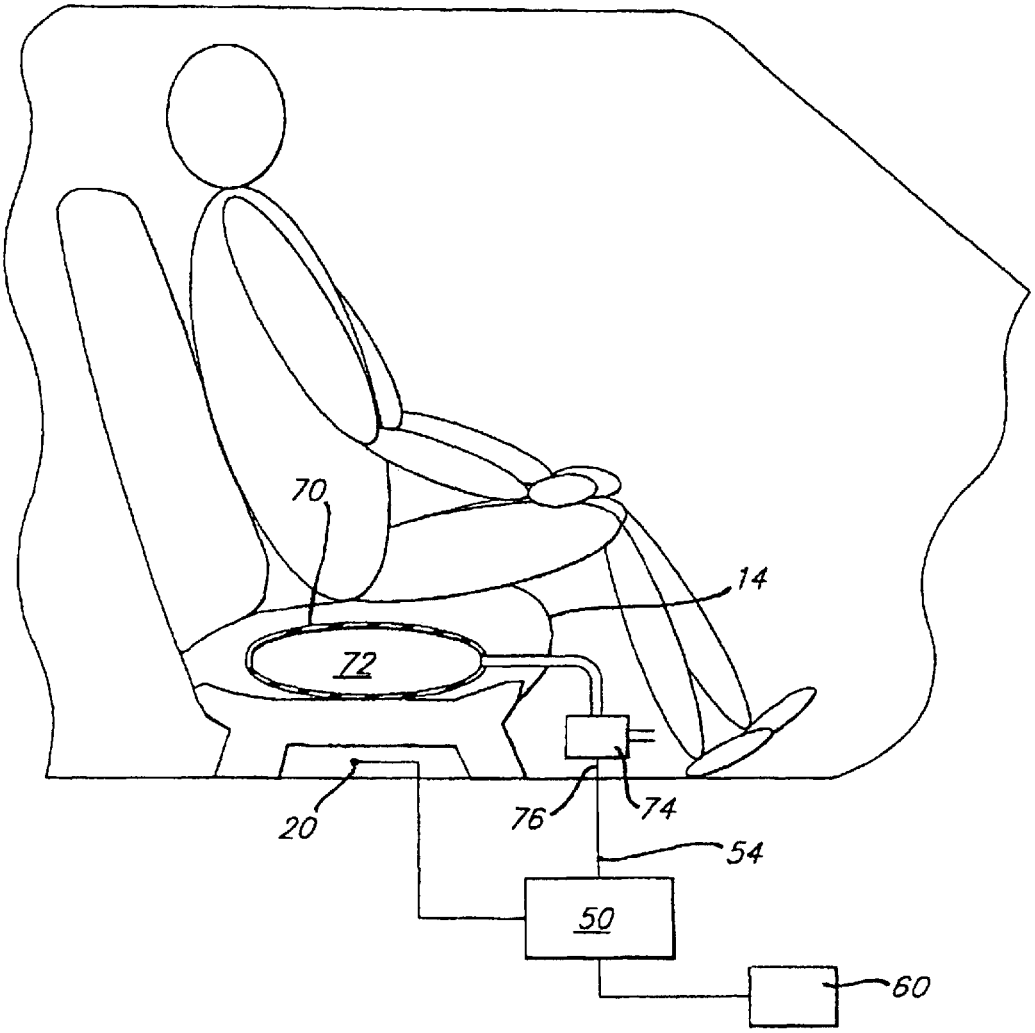
FIG. 3 is a diagrammatical view of an alternative embodiment of the instant invention.

Referring to FIG. 3 and as disclosed in U.S. application Ser. No. 08/993,701, a hydrostatic seat weight sensor 70 as incorporated in an alternative embodiment of the instant invention, comprises a gas filled bladder 72 mounted within the vehicle seat 14 and a differential pressure sensor 74 operatively coupled to the bladder 72 for measuring the difference in pressure between the bladder 72 and the atmosphere. The differential pressure sensor 74 provides a pressure sensor output 76 that is responsive to the force exerted downwardly on the seat 14. The differential pressure sensor output 76 is operatively coupled to input 54 of processor 50 thereby providing an indication of the force acting downwardly on the seat 14.

Figure 4:
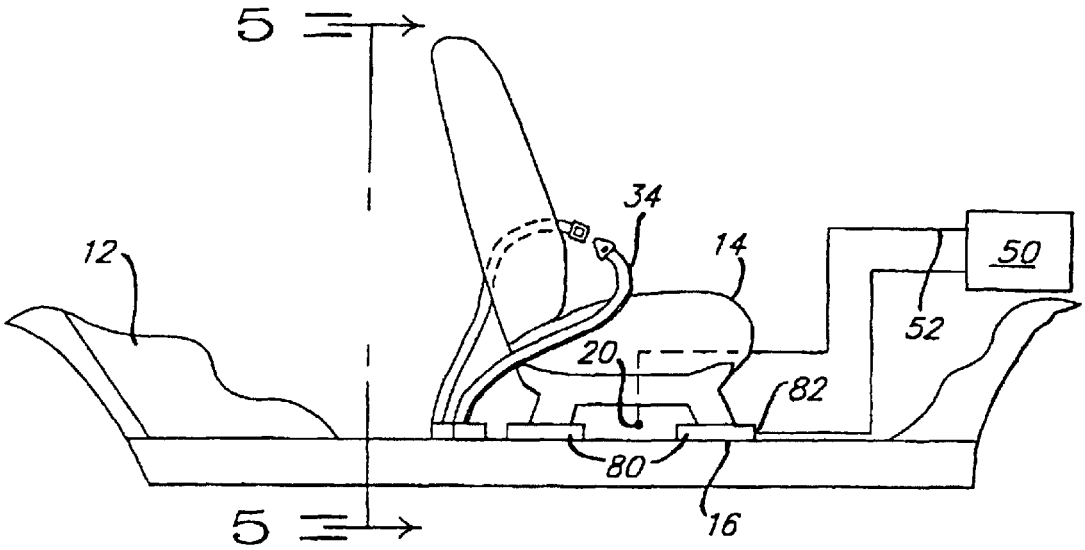
FIG. 4 is a diagrammatical view of an alternative embodiment of the instant invention.
Figure 5:
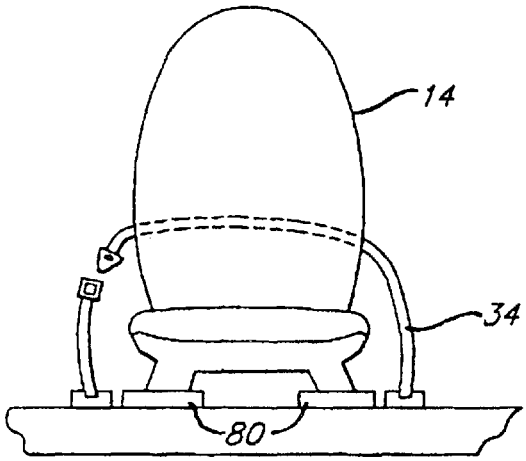
FIG. 5 is a view of the instant invention taken along the line 5—5 of FIG. 4.

As shown in FIG. 4, an alternative seat weight sensor comprises a plurality of load cells 80 disposed between the vehicle seat 14 and the vehicle structure 16 such that the entire weight of the seat 14 rests upon the load cells 80. The load cells 80 are provided with an output 82 that is responsive to the amount of force acting upon the seat 14. When utilizing load cells 80 as a weight sensors, it is critical that the seat belt 34 is mounted to the vehicle 12 such that load cell 80 is responsive to the force upon the seat 14 generated by tension present in the seat belt 34. For example, FIGS. 4 and 5 provide illustrations of a seat belt 34 configuration wherein the load cells 80 are responsive to both the tension applied by the seat belt 34 and the force resulting from a mass resting on the seat 14.

In operation, and in accordance with the preferred embodiment of the instant invention, the accelerometer 20 measures the vertical acceleration of the seat 14 and provides an output signal 22 to the processor 50. A normalized seatbelt tension measure is then calculated by the processor 50 to detect high belt tension and thereby determine the presence of a child seat.

The processor 50 is programmed to calculate an average mass of an object resting on the seat by dividing the output 32 of the weight sensor 30 by the earth's gravitational constant, g. This calculation may be performed at a predetermined time during the operation of the vehicle 12, or preferentially, performed continuously by assuming that the vertical acceleration of the vehicle 12 and the belt tension are negligible, and averaging the resultant successive mass calculations.

A predicted variation in force exerted on the seat 14 is calculated in the processor 50 by multiplying the aforementioned average mass by the measured variation in vertical acceleration as provided by the accelerometer 20 over a predetermined time period. The variation in vertical acceleration over time may be determined by integrating the absolute value of the difference between the accelerometer output 22 and the earth's gravitational constant g over the aforementioned time period.

The variation, or fluctuation of the actual force exerted on the seat 14 is then determined by integrating the absolute value of the difference between the seat weight sensor output 32 and the average force exerted on the seat 14. The normalized tension measurement is then calculated by dividing the variation in actual force exerted on the seat over the same time period as measured by the weight sensor 30, by the predicted variation in force exerted on the seat 14. The time period over which the predicted force variation is calculated must be sufficient to allow road induced bounce to impart vertical acceleration to the vehicle 12. In a preferred embodiment of the instant invention the time period used to calculate the normalized belt tension is .5 seconds.

In an alternative embodiment of the instant invention the processor 50 calculates the force exerted downwardly on the seat 14 at discrete time intervals utilizing the vertical acceleration measurement provided by the accelerometer 20, and assuming that no seat belt 34 tension is present in the system, and then compares the resultant predicted force with the actual measured force at each discrete point in time to calculate belt tension. As an example, the predicted force acting on the seat 14 may be calculated by programming the processor 50 to perform the following algorithm:

$$F=M(g-A)+BT,$$

where

F is the force acting downwardly onto the seat 14,

M is the mass of the object on the seat 14, g is the gravitational acceleration exerted on the mass M by the earth, A is the vertical acceleration of the vehicle 12, excluding the earth's gravity, and BT is the vertical component of the tension present in the belt 34.

The vertical acceleration A of the vehicle 12 fluctuates around zero and thus causes variations in the force F acting on the seat 14. The belt tension BT approximates a constant value that is near zero for most occupant seating situations except for the presence of tightly belted child seats. The belt tension BT is generally a small value because belt tension greater than a few pounds of force has been found to be uncomfortable for most vehicle occupants thereby making it unlikely that an occupant is present when there is significant tension in the seat belt 34.

As previously disclosed, the output signal 32 of the weight sensor 30 is divided by the earth's gravitational constant g by processor 50 to calculate the average mass M present in the vehicle seat 14. The processor 50 then calculates a predicted force acting downwardly on the seat 14 at discrete time intervals using the aforementioned average mass, with the assumption that the belt tension BT is zero. Still assuming zero belt tension BT, the processor 50 then compares the actual value of the force F as measured at each discrete point in time by the weight sensor 30 with the calculated or predicted force. The difference between the predicted and actual values of force F provides an indication of the tension present in the belt BT.

In an alternative method for predicting belt tension BT, the processor 50 monitors the weight sensor output signal 32 at discrete time intervals and measures the amplitude of the oscillations of the output signal 32 at each discrete point in time. The processor 50 further monitors the accelerometer output signal 22 at the corresponding discrete time intervals and calculates the amplitudes of the oscillations of the accelerometer output signal 22. The resultant accelerometer amplitude measurements are then sequentially multiplied by the average mass M present in the vehicle seat 14 to calculate the predicted force acting on the seat 14 at each discrete point in time. The ratio of the actual force acting on the seat 14 to the calculated force at each time interval thereby provides a measure of seat belt tension.

A tightly belted mass present in the vehicle seat 14 will produce a reduced ratio of actual force to predicted force as compared to the ratio calculated when a "free" mass is positioned in the vehicle seat 14. Therefore, the smaller the ratio between actual force as indicated by the weight sensor 30 to predicted force as calculated using the average mass M and the accelerometer output signal 22, the greater the belt tension BT, and the higher the probability that an infant seat is tightly belted down onto the vehicle seat 14. The processor 50 may be provided with a look-up table whereby seat belt 34 tension may be determined given a specific calculated tension ratio.

Accordingly, and as shown in FIG. 1, where the processor 50 calculates a level of tension in the seat belt 34 in excess of a predetermined maximum, the processor 50 will generate an output 56 operatively coupled to an air bag control system 60 to inhibit deployment of the air bag. Alternatively, where the processor 50 calculates a level of tension in the seat belt 34 below the predetermined maximum and the seat weight sensor 30 indicates that the occupant's weight is below a predetermined minimum, the processor 50 will provide an output 56 to the air bag control system 60 to reduce the inflation profile thereof according to the measured weight of the occupant.

While specific embodiments of the instant invention have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

I claim:

[1. A system for measuring seat belt tension in a vehicle having an airbag control system and a seat, comprising:

a.) an accelerometer rigidly secured to said vehicle in proximity to the seat thereof, said accelerometer having an output signal responsive to the vertical acceleration of said vehicle;

b.) a seat weight sensor having an output signal responsive to the force exerted by a mass on said seat; and c.) a computer processor having first and second inputs, the first input being operatively coupled to the output signal of said accelerometer and the second input being operatively coupled to the output signal of said seat weight sensor, wherein said processor calculates tension in said seat belt by comparing the output signal of said seat weight sensor at discrete time intervals with predicted fluctuations in the force exerted on the seat caused by vertical acceleration acting upon the mass, assuming no seatbelt tension.]

[2. The system of claim 1 wherein said seat weight sensor comprises a hydrostatic seat weight sensor disposed within the seat.]

[3. The system of claim 1 wherein said seat weight sensor comprises a plurality of load cells adapted to be responsive to the force exerted on the seat by said seat belt.]

[4. The system of claim 1 wherein said seat weight sensor comprises a plurality of force sensitive resistive elements disposed within the seat.]

[5. The system of claim 1 wherein said computer processor further comprises an output operatively coupled to said air bag control system for inhibiting said control system upon the calculation of high seat belt tension.]

[6. The system of claim 2 wherein said computer processor further comprises an output operatively coupled to said air bag control system for inhibiting an operation thereof upon the calculation of high seat belt tension.]

[7. The system of claim 3 wherein said computer processor further comprises an output operatively coupled to said air bag control system for inhibiting an operation thereof upon the calculation of high seat belt tension.]

[8. The system of claim 4 wherein said computer processor further comprises an output operatively coupled to said air bag control system for inhibiting an operation thereof upon the calculation of high seat belt tension.]

[9. A method for predicting seatbelt tension in a vehicle having a seat, an accelerometer rigidly secured to said vehicle in proximity to the seat, said accelerometer having an output signal responsive to a vertical acceleration of said vehicle, a seat weight sensor having an output signal responsive to a force exerted by a mass acting on the seat, and a processor having a first input operatively coupled to the output signal of said accelerometer and a second input operatively coupled to the output signal of said weight sensor comprising:

a.) measuring an actual variation in force due to vertical acceleration exerted on the seat over a predetermined time period;

b.) calculating an average mass on the seat;

c.) calculating a predicted variation in force due to vertical acceleration exerted on the seat by multiplying the average mass on the seat by the variation in vertical acceleration over a predetermined time period; and d.) dividing the actual variation in force by the predicted variation in force whereby a quotient represents normalized seatbelt tension.]

[10. A method for predicting seatbelt tension in a vehicle having a seat, an accelerometer rigidly secured to said vehicle in proximity to the seat, said accelerometer having an output signal responsive to a vertical acceleration of said vehicle, a seat weight sensor having an output signal responsive to a force exerted by a mass on the seat, and a processor having a first input operatively coupled to the output signal of said accelerometer and a second input operatively coupled to the output signal of said weight sensor comprising:

a.) measuring the force due to vertical acceleration exerted on the seat at discrete time intervals;

b.) calculating an average mass on the seat;

c.) calculating at discrete time intervals a predicted force acting on the seat due to vertical acceleration, assuming the tension in said seat belt is zero; and d.) calculating at discrete time intervals a difference between the measured force exerted on the seat and the predicted force whereby the difference is indicative of seat belt tension.]

[11. A method for predicting seatbelt tension in a vehicle having a seat, an accelerometer rigidly secured to said vehicle in proximity to the seat, said accelerometer having an output signal responsive to a vertical acceleration of said vehicle, a seat weight sensor having an output signal responsive to a force exerted by a mass on the seat, and a processor having a first input operatively coupled to the output signal of said accelerometer and a second input operatively coupled to the output signal of said weight sensor comprising:

a.) measuring the force due to vertical acceleration exerted on the seat at discrete time intervals;

b.) calculating an average mass on the seat;

c.) measuring the vertical acceleration acting on said vehicle at discrete time intervals;

d.) calculating at discrete time intervals a predicted force exerted on the seat by multiplying the vertical acceleration at each time interval by the average mass, assuming the tension in said seat belt is zero; and e.) calculating at discrete time intervals a ratio between the measured force exerted on the seat and the predicted force exerted on the seat whereby the ratio is indicative of seat belt tension.]

*12. A system for controlling the actuation of a restraint actuator in a vehicle, comprising:*

*a.) an accelerometer operatively coupled to the vehicle, wherein said accelerometer generates a first signal*

*responsive to a vertical acceleration of the vehicle proximate to a seat thereof, wherein said seat is associated with the restraint actuator;*

*b.) a force responsive sensor operatively coupled to said seat, wherein said force responsive sensor generates a second signal responsive to a weight on said seat; and*

*c.) a processor operatively coupled to said accelerometer and to said force responsive sensor, wherein said processor is adapted to generate a third signal for controlling the actuation of the restraint actuator, and said third signal is responsive to both said first signal and said second signal.*

*13. A system for controlling the actuation of a restraint actuator in a vehicle as recited in claim 12, wherein said accelerometer is rigidly secured to the vehicle in proximity to said seat.*

*14. A system for controlling the actuation of a restraint actuator in a vehicle as recited in claim 12, wherein said force responsive sensor comprises a hydrostatic seat weight sensor disposed within said seat.*

*15. A system for controlling the actuation of a restraint actuator in a vehicle as recited in claim 12, wherein said force responsive sensor comprises a plurality of load cells adapted to be responsive to the force exerted on said seat responsive to a seat belt associated therewith.*

*16. A system for controlling the actuation of a restraint actuator in a vehicle as recited in claim 12, wherein said seat weight sensor comprises a plurality of force sensitive resistive elements disposed within said seat.*

*17. A system for controlling the actuation of a restraint actuator in a vehicle as recited in claim 12, wherein said third signal is responsive to whether the mass on the force sensor is free to travel vertically.*

*18. A system for controlling the actuation of a restraint actuator in a vehicle as recited in claim 12, wherein said third signal provides for discriminating a tightly belted mass on said seat.*

*19. A system for controlling the actuation of a restraint actuator in a vehicle as recited in claim 12, wherein said third signal provides for predicting whether an occupant on said seat is an adult or a child.*

*20. A system for controlling the actuation of a restraint actuator in a vehicle as recited in claim 12, wherein said restraint actuator comprises an air bag.*

*21. A method of controlling the actuation of a restraint actuator in a vehicle, comprising:*

*a.) generating a first signal responsive to a vertical acceleration of the vehicle proximate to a location of a seat, wherein said seat is associated with the restraint actuator;*

*b.) generating a second signal responsive to a weight upon said seat of the vehicle; and*

*c.) controlling the actuation of the restraint actuator responsive to said first and second signals.*

*22. A method of controlling the actuation of a restraint actuator in a vehicle as recited in claim 21, wherein the operation of controlling the actuation of the restraint actuator comprises:*

*a.) determining an average mass on said seat from said second signal;*

*b.) determining a first variation responsive to a plurality of said second signals within a time period;*

*c.) determining a second variation responsive to a plurality of said first signals within said time period; and*

*d.) determining a quotient responsive to a division of said first variation by said second variation and by said average mass, wherein the operation of controlling the actuation of the restraint actuator is responsive to said quotient.*

*23. A method of controlling the actuation of a restraint actuator in a vehicle as recited in claim 21, wherein the operation of controlling the actuation of the restraint actuator comprises:*

*a.) determining an average mass on said seat from said second signal; and*

*b.) determining a quotient responsive to a division of a measure responsive to said second signal by a measure responsive to said first signal and by said average mass, wherein the operation of controlling the actuation of the restraint actuator is responsive to said quotient.*

*24. A method of controlling the actuation of a restraint actuator in a vehicle as recited in claim 22, wherein the actuation of the restraint actuator is inhibited if said quotient is less than a threshold.*

*25. A method of controlling the actuation of a restraint actuator in a vehicle as recited in claim 23, wherein the actuation of the restraint actuator is inhibited if said quotient is less than a threshold.*

*26. A method of controlling the actuation of a restraint actuator in a vehicle as recited in claim 21, wherein the operation of controlling the actuation of the restraint actuator comprises:*

*a.) determining an average mass on said seat from said second signal; and*

*b.) determining a difference between a measure responsive to said second signal and a product of said average mass and a measure responsive to said first signal, wherein the operation of controlling the actuation of the restraint actuator is responsive to said difference.*

*27. A method of controlling the actuation of a restraint actuator in a vehicle as recited in claim 26, wherein the actuation of the restraint actuator is inhibited if the magnitude of said difference is greater than a threshold.*

*28. A method of controlling the actuation of a restraint actuator in a vehicle as recited in claim 21, wherein said first and second signals are generated as discrete time intervals.*

*29. A system for controlling the actuation of a restraint actuator in a vehicle as recited in claim 21, wherein said restraint actuator comprises an air bag.*

* * * * *